US006858239B2

(12) United States Patent
Julien

(10) Patent No.: US 6,858,239 B2
(45) Date of Patent: *Feb. 22, 2005

(54) FEED ADDITIVE AND METHOD FOR CONTROLLING LARGE BOWEL FERMENTATION IN THE HORSE AND SIMILAR ANIMALS

(75) Inventor: William E. Julien, Omaha, NE (US)

(73) Assignee: Biovance Technologies, Inc., Omaha, NE (US)

(*) Notice: Subject to any disclaimer, the term of this patent is extended or adjusted under 35 U.S.C. 154(b) by 287 days.

This patent is subject to a terminal disclaimer.

(21) Appl. No.: 10/021,405

(22) Filed: Dec. 12, 2001

(65) Prior Publication Data

US 2003/0108653 A1 Jun. 12, 2003

(51) Int. Cl.[7] .............................. A23K 1/06; A23K 1/18
(52) U.S. Cl. .............................. 426/53; 426/49; 426/54; 426/635; 426/85; 426/807
(58) Field of Search .............................. 426/49, 53, 54, 426/635, 805, 807

(56) References Cited

U.S. PATENT DOCUMENTS

| | | | |
|---|---|---|---|
| 2,758,027 A | 8/1956 | Gillis | 99/2 |
| 2,789,939 A | 4/1957 | Kita | 195/36 |
| 3,639,210 A | 2/1972 | Tanaka et al. | 195/28 R |
| 3,912,822 A | 10/1975 | Yokotsuka et al. | 426/44 |
| 4,045,489 A | 8/1977 | Wiegers et al. | 260/586 C |
| 4,334,020 A | 6/1982 | Nakazawa et al. | 424/94.6 |
| 4,411,991 A | 10/1983 | Hirakawa et al. | 435/42 |
| 4,800,088 A | 1/1989 | Sawhill | 426/69 |
| 5,372,811 A | 12/1994 | Yoder | 424/94.6 |
| 5,635,198 A | 6/1997 | Nishimura et al. | 424/438 |
| 5,709,894 A | 1/1998 | Julien | 426/53 |
| 5,783,238 A | 7/1998 | Julien | 426/53 |
| 5,863,574 A | 1/1999 | Julien | 426/53 |
| 6,312,710 B1 | 11/2001 | Julien | 424/438 |
| 6,514,521 B1 * | 2/2003 | Julien | 424/442 |
| 2002/0083748 A1 * | 7/2002 | Julien | 71/11 |

FOREIGN PATENT DOCUMENTS

| | | |
|---|---|---|
| CH | 442947 | 8/1967 |
| DE | 1222773 | 8/1966 |
| FR | 0041894 | 12/1981 |
| GB | 955642 | 7/1962 |
| JP | 244318 | 10/1987 |
| JP | 173923 | 7/1989 |
| JP | 277240 | 12/1991 |
| JP | 192093 | 8/1993 |
| WO | WO 98/49903 | 11/1998 |

OTHER PUBLICATIONS

IMC, Dyna–Ferm Brochure, 1950.
Association of American Feed Control Officials, "Feed Ingredient Definitions", 1992, pp. 147–148.
Randy Shaver and Ric Grummer, "Feeding and Management of the Close–Up Dry Dairy Cow", Proceedings of the 13th Western Nutrition Conference, Sep. 16–17, 1992, pp. 191–198.
Jesse P. Goff and Ronald L. Horst, "Anionic Salts Help Prevent Milk Fever", Hoard's Dairyman, Dec. 1992, p. 837.
S.A. Wandji et al., "Effects of intrahypothalmic injections of GABA, muscimol, pentrobarbital, and L–glutamic acid on feed intake of satiated sheep", Can. J. Physiol. Pharmacol, 67, 5–9, (1989), pp. 5–9.
Robert H. Brown, "Probing Byproducts for Feed Attracting Research Interest", FEEDSTUFFS, Apr. 11, 1983, p. 35.
W.H. Hoover et al., "Effects of Differential Solid–Liquid Removal Rates on Protozoa Numbers in Continuous Cultures of Rumen Contents", J. Animal Sci., vol. 43, p. 528, 1976.
P.H. Robinson et al., "Influence of Declining Level of Feed Intake and Varying the Proportion of Starch in the Concentrate of Rumen Ingesta Quantity, Composition and Kinetics of Ingest Turnover in Daily Cows", Livestock Production Scient., 17(1987), pp. 37–62.
A.M. Van Vuuren, "Effect of Level of Hay Intake, Method of Marker Administration and Stage of Lactation on Rate of Passage Through the Reticulorumen", Can. J. Anim. Sci. 64 (Suppl.): 80–81 (Sep. 1984).
P.E. Colucci et al., "Feed Intake, Apparent Diet Digestibility, and Rate of Particulate Passage in Dairy Cattle", J. Dairy Sci. 65: 1445–1456 (1982).
F.B. Morrison, "Feeds and Feeding, A Handbook for the Student and Stockman", (1954), pp. 1138–1141, 1170–1171.
O.H. Siegmund et al., "The Merck Veterinary Manual, A Handbook of Diagnosis and Therapy for the Veterinarian", (1973), pp. 830–835.
Yoshimura, et al., CABA abstract #951413050, Nippon Nogeikagaku Kaishi, vol. 69, No. 3, (1995), pp. 347–356.

* cited by examiner

*Primary Examiner*—Chhaya Sayala
(74) *Attorney, Agent, or Firm*—Paul M. Denk

(57) ABSTRACT

A feed additive for equines, comprising dried glutamic acid fermentation solubles, dried corn fermentation solubles, or a mixture of dried glutamic acid fermentation solubles and dried corn fermentation solubles, wherein said dried solubles have been dried to a total moisture content of less than 30% by weight at a temperature not less than about 80° F. and not more than about 900.

11 Claims, No Drawings

FEED ADDITIVE AND METHOD FOR CONTROLLING LARGE BOWEL FERMENTATION IN THE HORSE AND SIMILAR ANIMALS

CROSS-REFERENCE TO RELATED APPLICATION

N/A

STATEMENT REGARDING FEDERAL SPONSORED RESEARCH OF DEVELOPMENT

N/A

BACKGROUND OF THE INVENTION

In the natural state, the genus equidae, horses, mules, donkeys, etc., are grazing animals. Unlike a ruminant, the gut capacity of these animals in relation to their body size is small. This requires the animal to consume small amounts of food at relatively frequent intervals.

The diet of the horse is largely composed of materials high in cellulose, such as hay or pasture grass. The digestive enzymes produced in the glandular stomach and small intestine are not effective in the degradation of these materials. The horse is largely dependent upon the bacteria resident in its caecum and colon to fermentatively break down the cellulose into substances which can be then absorbed and utilized directly.

The efficacy of fermentation in the horse is dependent upon substrate availability. In a natural state, horses and similar animals, because of the continuous ingestion of small amounts of feed, specifically forage, have a relatively constant flow of substrate in the form of ingesta, available for hind gut bacterial, fermentative use. However, under current husbandry practices, this is often not the case. Instead, animals consume a significant portion of their diet in the form of small grains, ingested over a short period of time. This results in erratic movement of ingesta through the GI tract. This material often reaches the large bowel relatively undegraded. This allows for a bacterial fermentation action that causes significant changes in large bowel pH, which in turn, results in fluctuations in species and densities of colonic bacterial populations. Nutrient use efficiency is depressed, thus negatively impacting an important part of the digestive process in these type animals. In addition, destabilization of the large bowel has been associated with certain serious metabolic diseases in the horse, such as colic and the formation of enterolythes, both life threatening situations in the horse. Currently there is no known way to control intestinal pH, or stimulate or modify large bowel bacterial populations in the horse, other than feeding methodology and restrictive use of certain ingredients. Considering that modern husbandy practices make his almost impossible to achieve, methods of controlling these key parameters are much needed.

SUMMARY OF THE INVENTION

This invention contemplates the usage of a composition which is obtained from glutamic acid fermentation solubles, corn fermentation solubles or mixture thereof, and any other related source materials that provide the components of these types of fermentation solubles. The solubles are dried to a maximum moisture content of about 30%, at low temperature. The moisture content will be dried to somewhere in the vicinity of 14%, more or less, for use in this feed additive. The dried fermentation solubles are then blended with a source of organic and inorganic nitrogen, of variable solubles in the form of nonprotein nitrogen, peptides, amino acids, and intact protein, derived in the preferred embodiment of the invention from glutamic acid fermentation solubles and/or corn fermentation solubles to which a carrier and additional amino acids may be added, which greatly enhances feed additives of this type as known in the prior art.

Feeding this type of a mixture to animals such as horses, and related animals, which are normally dependent upon bacteria resident in its caecum and colon to fermentatively break down the cellulose in their diet, enhances the digestive process of these types of animals, so that the derived substances can be absorbed and utilized directly by the stomach, of the digestive tract.

In view of the deficiencies in the art as described above and other related goals well known in the art, one object of the present invention is to provide a feed additive that stimulates large bowel bacterial growth in the horse.

Another object of the present invention is to provide a feed additive that stabilizes large bowel pH with the specific objective of maintaining intestinal pH at levels that prevent the formation of enterolythes and other maladies associated with pH ranges greater than 6.7.

These and other objects may become more apparent to those skilled in the art upon reviewing the subject matter of this invention as detailed herein.

DESCRIPTION OF THE PREFERRED EMBODIMENT

The above objects have been obtained by the discovery of a composition of dried free amino acids, peptides, organic and inorganic nitrogen, as well as structural fiber and nonstructural carbohydrates as needed. In the preferred embodiment of the invention, this composition is obtained from either glutamic acid fermentation solubles, corn fermentation solubles or a mixture thereof, although any source material that provides the components of these fermentation solubles may be used. Common sources are fermentation byproducts derived from a fermentation of fungal or bacterial origin. Examples include corn step liquor, corn distiller's solubles, and rye distiller's solubles. The origin of the base materials is not important. That they provide the components of corn and/or glutamic acid fermentation soluble is important. A carrier such as wheat middlings, etc., can be included if desired and in view of the drying method used. Any amount of carrier can be used. Typical ranges (st/wt) of dried solubles to wheat middlings are from 10 to 1 to 1 to 10 including all vales and subranges there between. The carrier is preferably edible by the ruminant and is preferably a common feed ingredient. Either of these solubles alone or individually, blended onto a carrier if necessary, are suitable. When the corn and glutamic acid fermentation solubles are mixed, they are mixed in any proportion, either before or after drying and each optionally on a carrier if mixed dry.

The one or more solubles is then dried to a maximum moisture content of about 30% at low temperature. Moisture contents of 0%, 8%, 14%, etc., are acceptable. Drying methods which may be used include vacuum drying, direct and indirect heat application, spray drying, evaporation, etc. A forced air grain processor, otherwise useful to roast soybeans, is preferred. Regardless of the method used, drying must be done at temperatures which will allow for modification of the solubility of the nitrogen fractions without denaturing them.

The present inventor has provided a blended source of organic and inorganic nitrogen of variable solubilities in the form of nonprotein nitrogen, peptides, amino acids and intact protein derived in the preferred embodiment of the invention from glutamic acid fermentation solubles and/or corn fermentation solubles to which a carrier and additional amino acids can be added, and which is superior to prior art compositions.

Glutamic acid fermentation solubles and corn fermentation solubles are the liquid effluents having greater than 30 wt. % water (moisture), typically 50%–60% from the bacterial fermentative process used to produce monosodium glutamate and lysine hydrochloride, respectively. These processes are well known and common manufacturing processes, and the nomenclature by which these products are defined has been determined by the Association of American Feed Control Officials. Glutamic Acid Fermentation solubles is comprised of a combination of water, nonprotein nitrogen, primarily in the form of ammonium chloride, peptides and free amino acids derived from the hydrolysis of the microorganisms used to produce the fermentation, glutamic acid and inorganic sales such as Mg, $SO_4$, NaCl, $KH_3PO_4$. Corn Fermentation Solubles is comprised of a combination of water, nonprotein nitrogen, primarily in the form of ammonium sulfate, peptides and free amino acids derived from the hydrolysis of the microorganisms used to produce the fermentation and inorganic salts such as $MsSO_4$, NaCl and $MnSO_4$.

Any amino acid may be added to the invention mixture described above.

The invention is useful as a feed additive in any equine animal's diet.

The invention feed supplement may be added to any feed fed to equine animals, preferably to feeds comprising at least one of grain byproducts, oilseeds and oilseed meals, corn grain, and small grans, etc., to provide a supplemented feed. The amount added will generally range from about 0.10 to about 2 lbs. Per head per day, depending upon application and species to be fed.

Having generally described this invention, a further understanding can be obtained by reference to certain specific examples which are provided herein for purposes of illustration only and are not intended to be limiting.

EXAMPLES

Preparation of the Feed Supplement

In this example, the drying method used is forced air, although any process which allows for the removal of excess moisture while not damaging the biological value of the nitrogen components of the invention can be used, with the necessary modifications in materials preparation as dictated by the method used.

A mixture of Glutamic Acid Fermentation Solubles and Corn Fermentation Solubles at a ration of 60/40 on a weight, weight basis is blended onto a wheat middlings carrier on a 1.67 to 1 weight, weight ratio of solubles to wheat middlings. These rations can vary with the intended end product, or either of the components that make up the liquid blend can be used alone. The carrier may also be omitted if not desired or required by the drying process used. The material is then exposed to forced air at temperatures not less than about 80° F., but not more than about 900° F., with a preferred range being between about 190° F. and about 280° F. for a period of not less than about three minutes. This material is then cooled to about 90° F. and then about 1/3 of this material is recycled and reblended and again exposed to forced air temperatures not less than about 80° F., but not more than about 900° F. The material has a final moisture content of about 15% by weight based on total weight. This material can then be fed directly to the animal as part of its formulated ration, with use rate dictated by species and intended dietary application.

An Investigation into the Use of the Invention Feed Additive for Controlling Lart pH and Stimulating Colonic Microbial Efficiency and Yield in the Horse

Experiment 1

Sixteen mature horses, with an average body weight of 1100 pounds were divided into two groups of 8 each. Twice a day, each animal was fed 3 pounds of a grain supplement for a total daily consumption of six pounds. Each group received an identical grain mix, with the only difference being that the invention feed additive was substituted for unit for unit of soybean meal. The feeding rate per head per day was 340 grams. Alfalfa hay of good quality was offered free choice. After thirty days both groups were sacrificed, and the intestinal contents removed for analysis. Colonic pH averaged pH 6.1 across all treatment animals. The control group had an average pH of 6.72. The difference between control and treatment was significant at the 0.05 level. Measurement of volatile fatty acid content (VFA) showed significant differences in proportionate concentrations, with highest concentrations being in the treatment group. This was also significant at the 0.05 level. Differences were also noted in water content and fibre fragility, again in favor of the treatment group. The conclusion of this study is the invention feed additive when added to the diet of a mature horse will impact colonic fermentative efficiency and bacterial growth as reflected in VFA production and pH.

Experiment 2

Two groups of 120 multiparous mares were followed through the first 90 days part partum for two reproductive cycles. One group was supplemented with the invention feed additive as referenced in experiment one. The other group served as the control. Supplementation began 21 days prior to parturition and continued to 90 days post partum. Incidence of post partum intestinal distrubance (colic) and body weight loss during lactation were observed and recorded. Bouts of treatable colic in the two groups were 7% and 2% for controls and treatment groups respectively (P=0.01). Weight loss in the controls averaged 75 pounds from day 5 post partum to 90 days, while treatment weight loss averaged 40 pounds (P=0.5). This experiment clearly shows that the invention feed additive positively impacts intestinal motility and health, as indicated by colic bout reduction and weight loss reduction.

Variations or modifications to the subject matter of this invention may occur to those skilled in the art upon review of the description of the invention as provided herein. Such variations, if within the scope of this development, are intended to be encompassed within the overall invention as described herein. The description of the preferred embodiment, and the examples set forth, are provided for illustrative purposes only.

I claim:

1. A feed additive for equines, comprising dried glutamic acid fermentation solubles, dried corn fermentation solubles, and glutamic acid or a mixture of dried glutamic acid fermentation solubles and dried corn fermentation solubles, and glutamic acid, wherein said dried solubles have been dried to a total moisture content of less than 30% by weight at a temperature not less than 80° F. and not more than 900° F.

2. The feed additive as claimed in claim 1, further comprising a carrier.

3. The feed additive as claimed in claim 2, wherein said carrier is wheat middlings.

4. A method for feeding an animal, comprising feeding to said animal the feed additive of claim 1 in an amount of from 0.10 to 2.0 pounds per day.

5. The feed additive as claimed in claim 1, wherein said dried solubles are dried glutamic acid fermentation solubles.

6. The feed additive as claimed in claim 1, wherein said dried solubles are dried corn fermentation solubles.

7. The feed additive as claimed in claim 1, wherein said dried solubles are a mixture of dried glutamic acid fermentation solubles and dried corn fermentation solubles.

8. The method as claimed in claim 4, wherein said feed additive comprises said dried glutamic acid fermentation solubles.

9. The method as claimed in claim 4, wherein said feed additive comprises said dried corn fermentation solubles.

10. The method as claimed in claim 4, wherein said feed additive comprises said mixture of dried glutamic acid fermentation solubles and dried corn fermentation solubtes.

11. A feed additive for animals, consisting of dried glutamic acid fermentation solubles, dried corn fermentation solubles, glutamic acid, or a mixture of glutamic acid, dried glutamic acid fermentation solubles and dried corn fermentation solubles, wherein said dried solubles have been dried to a total moisture content of less than 30% by weight at a temperature not less than 80° F. and not more than 900° F.

* * * * *